(12) United States Patent
Soulet

(10) Patent No.: US 7,440,887 B2
(45) Date of Patent: Oct. 21, 2008

(54) METHOD AND APPARATUS FOR CAUSING ONE MESSAGING SERVICE TO MIGRATE TOWARDS ANOTHER

(75) Inventor: Serge Soulet, Rennes (FR)

(73) Assignee: France Telecom, Paris (FR)

( * ) Notice: Subject to any disclaimer, the term of this patent is extended or adjusted under 35 U.S.C. 154(b) by 828 days.

(21) Appl. No.: 10/826,180

(22) Filed: Apr. 16, 2004

(65) Prior Publication Data
US 2004/0267890 A1 Dec. 30, 2004

(30) Foreign Application Priority Data
Apr. 18, 2003 (FR) ................................. 03 04852

(51) Int. Cl.
*G06F 15/13* (2006.01)
(52) U.S. Cl. ...................... 703/206; 703/203; 703/204; 703/205; 379/88.22
(58) Field of Classification Search ................ 709/203, 709/204, 205, 206; 379/88.22
See application file for complete search history.

(56) References Cited

U.S. PATENT DOCUMENTS

| 6,018,762 | A  | * | 1/2000  | Brunson et al. ............. 709/206 |
| 6,188,887 | B1 | * | 2/2001  | Joong et al. ................ 455/417 |
| 6,298,375 | B1 |   | 10/2001 | Millard |
| 6,738,458 | B1 | * | 5/2004  | Cline et al. ............... 379/88.18 |
| 6,947,969 | B2 | * | 9/2005  | Mann et al. .................. 709/206 |
| 6,965,918 | B1 | * | 11/2005 | Arnold et al. ................ 709/206 |
| 7,254,612 | B2 | * | 8/2007  | Green et al. ................. 709/206 |
| 2003/0059004 | A1 | * | 3/2003 | Jiang et al. ............... 379/88.17 |

OTHER PUBLICATIONS

Bostick J, et al., "Email migration: stratagies and outcomes", Proceedings, ACM Siguccs 1997 User Services Conference XXV, 1997, pp. 29-34.

* cited by examiner

*Primary Examiner*—Jinsong Hu
(74) *Attorney, Agent, or Firm*—Cohen Pontani Lieberman & Pavane LLP

(57) ABSTRACT

In the migration method of the invention, for each migration request (MR) recorded in a migration control server (MCS), the following steps are performed in succession: a second mailbox (BOX2) is created in an electronic messaging service system (S2), the first access address (AD1) of the first mailbox (BOX1) that is to migrate from a first messaging service system (S1) is formed as the access electronic address giving access to the users from the outside for the second mailbox (BOX2), and the physical electronic address (ADP1) recorded for the mailbox (BOX1) is changed, in a directory database (DIR), into the physical electronic address (ADP2) of the mailbox (BOX2).

21 Claims, 3 Drawing Sheets

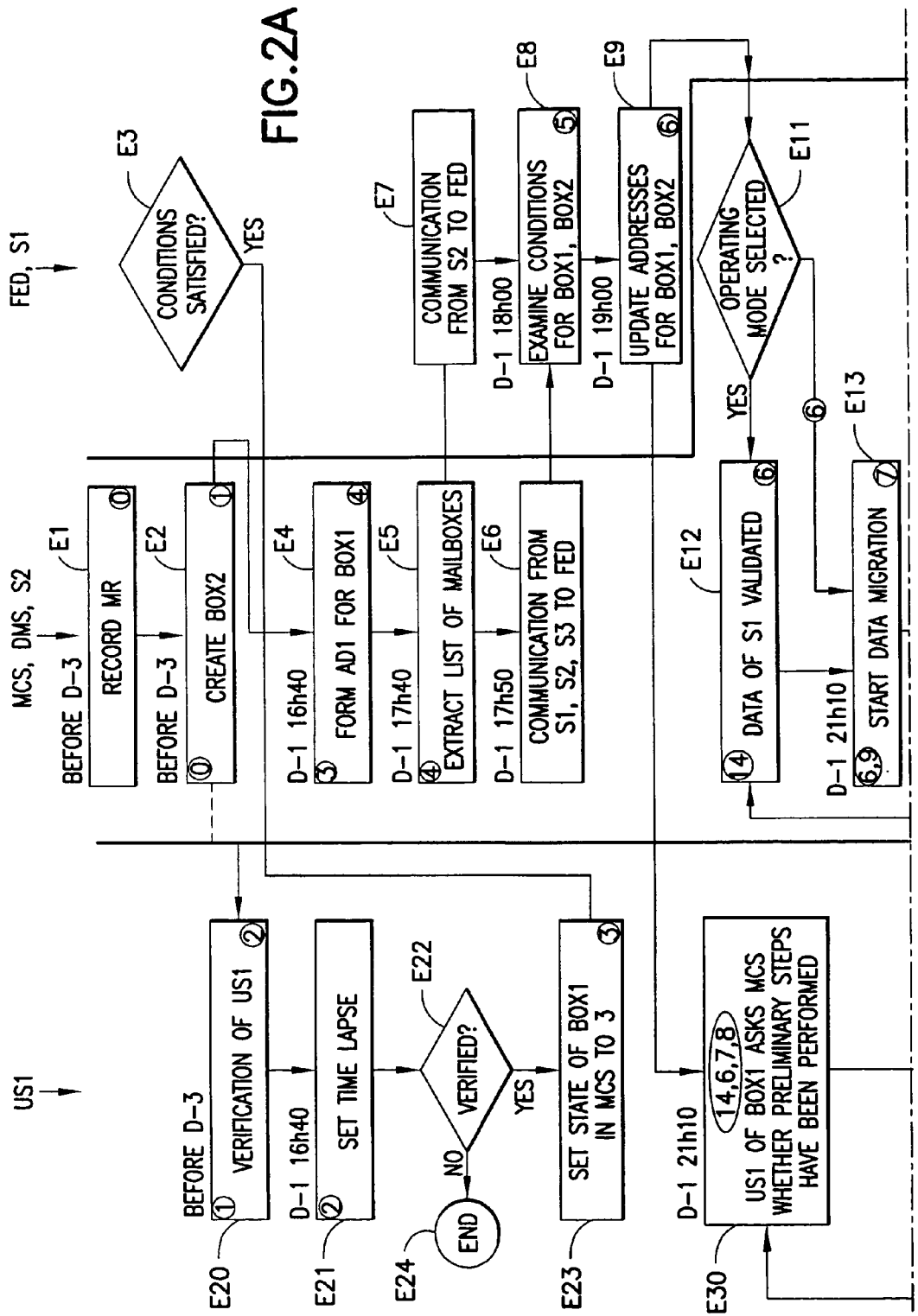

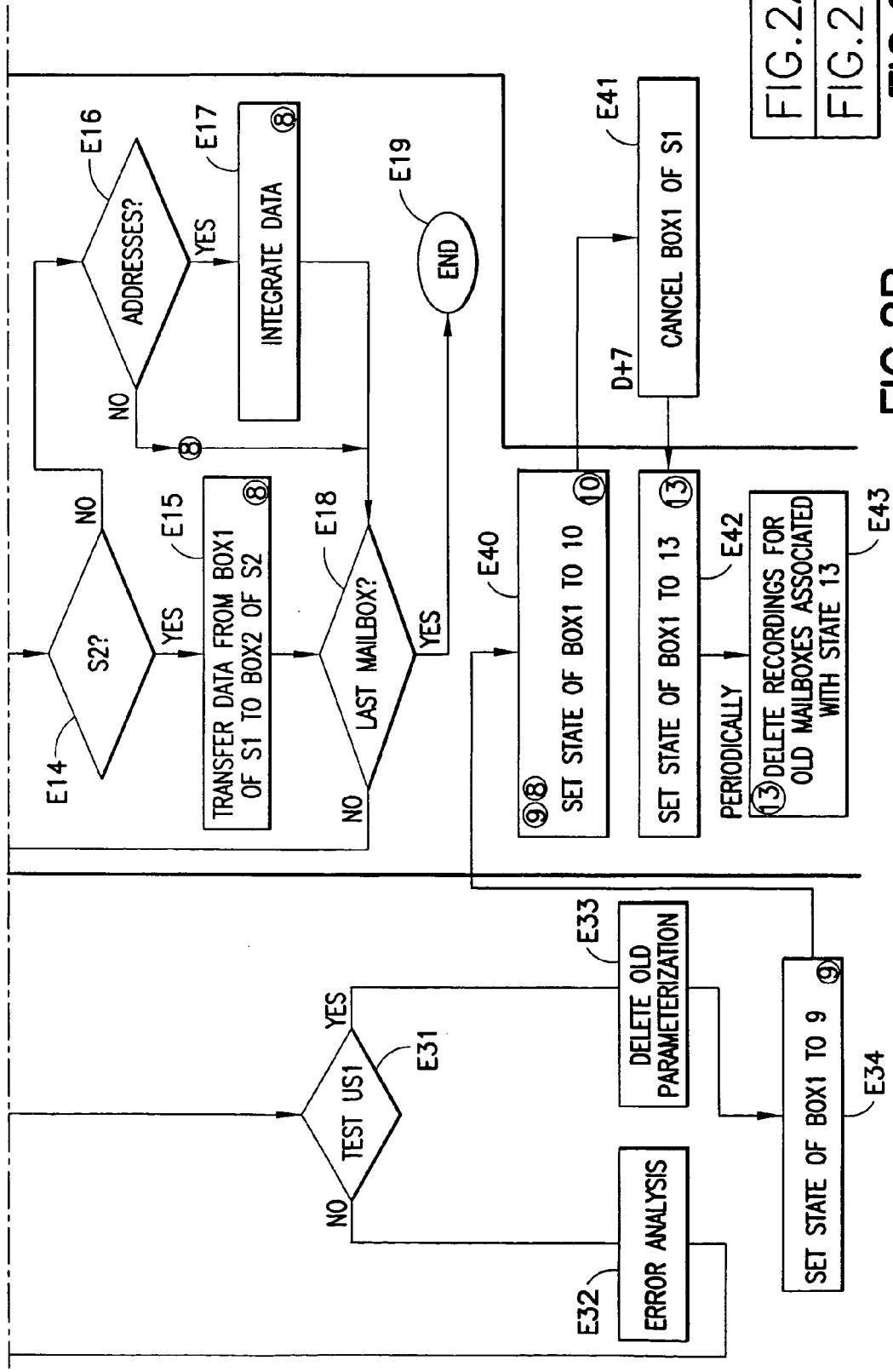

METHOD AND APPARATUS FOR CAUSING ONE MESSAGING SERVICE TO MIGRATE TOWARDS ANOTHER

BACKGROUND OF THE INVENTION

The invention relates to a method for causing one electronic messaging service system to migrate towards another, and to apparatus for implementing said method.

A field of application for the invention relates to deployment, including international deployment, of messaging service systems of large entities, such as large firms.

Currently, numerous messaging service systems exist such as Exchange®, and Notes® (registered trademarks), to mention but the most well known.

Although the same messaging service system makes it possible to manage a large number of electronic messaging service mailboxes, migration of said mailboxes from one messaging service system to another different or identical messaging service system is not without difficulties.

To achieve such migration, it is necessary to co-ordinate properly the tasks executed on the server(s) of the first messaging service system that is to migrate towards the second messaging service system, and the tasks executed on the server(s) of the second messaging service system. It can also be difficult to synchronize the parameterization of the workstations at the time at which the messaging service migrates. During the migration, each technician in charge of performing one of the tasks must obtain information from the other technicians involved about the state of progress of the other tasks, and must wait for the other technicians to confirm that said other tasks have been performed properly in order for the technician to start his or her own task.

In spite of the numerous possibilities offered to all of the players involved for communicating between themselves, be it through physical meetings or through modern communications means, the extraordinary difficulty of genuinely synchronizing the tasks of the players usually means that the messaging services are shut down completely for at least one weekend during which said tasks are performed. This results in a period during which the mailboxes that are to migrate are unavailable. For example, the mailboxes that are to migrate do not receive the messages that are sent during that period of unavailability to the first messaging service system hosting them, even though such messages are addressed to them.

SUMMARY OF THE INVENTION

An object of the invention is to provide a method for causing one electronic messaging system to migrate automatically to another, and apparatus for implementing said method, which method and apparatus mitigate the drawbacks of the state of the art, and improve the continuity of the messaging service for the user(s) of the mailbox that is to migrate.

To this end, the invention firstly provides a method for causing at least a first electronic messaging service mailbox of at least a first electronic messaging service system connected to at least a first user station for a user of said first mailbox to migrate towards a second electronic messaging service system, the first electronic messaging service mailbox having a first physical electronic address and at least one first access electronic address for giving access to users from the outside;

said method being characterized in that each of the first and second messaging service systems is connected to a message routing center including a directory database containing the addresses associated with the mailboxes of the messaging service systems; and during a first step a migration request is recorded on a migration control server, which request contains, in association, at least the first access address of the first mailbox and a scheduled migration instant for migration of the first mailbox;

then, for each migration request recorded in the migration control server, and in succession, during a second step, a second electronic messaging service mailbox having a second physical address is created in the second electronic messaging service system; and when prescribed conditions including the arrival of the scheduled migration instant have been verified as being satisfied, a third step is executed in the second electronic messaging service system, during which the first access address of the first mailbox is formed as the electronic access address for users from the outside for the second mailbox;

when conditions required on the first and second mailboxes have been verified by the message routing center as being satisfied, during a fourth step, in the message routing center, and for the first mailbox a queue is activated for any incoming messages that are addressed to the first access address so that they do not arrive in the first mailbox; and during a fifth step, in the directory database, the physical electronic address recorded for the first mailbox is changed into the physical electronic address of the second mailbox, the queue is deactivated, and the messages held up in the queue for the first mailbox are transferred to the second mailbox.

By means of the invention, the migration of the first mailbox is performed transparently for its user and for the correspondents sending said user messages during the migration, and it is not necessary for said correspondents to be informed of said migration. Thus, the messaging service associated with the first mailbox to be migrated is not interrupted due to the migration, and the messages sent to said mailbox are not lost and can be received by its user. The invention also makes it possible to avoid requiring a multitude of tasks to be performed by different technicians, which tasks are tedious and complex to manage.

According to other characteristics of the invention:

the second electronic messaging service system has at least one third electronic messaging service mailbox and is connected to at least one third user station of said third mailbox, and the second electronic messaging service mailbox created during the second step further has the first access address as its access address for access from the third user station of the second electronic messaging service system, and, during the second step, in the second electronic messaging service, system redirection is established for redirecting the second mailbox towards the first mailbox so as to redirect any message arriving at the second mailbox towards the first mailbox, said redirection being cancelled during the third step;

the directory database records the addresses associated with the mailboxes of the messaging service systems including their aliases;

during the third step, the directory database communicates the contact formed by the addresses and aliases associated with the first access address to the second electronic messaging service system, which records it in a table of contacts provided in said second system, the addresses and/or aliases associated in said table of contacts with the contact having the first access address are formed as additional access electronic address for users from the outside for the second mailbox, then said contact is deleted from the table;

a plurality of first electronic messaging service systems connected to at least one mailbox user station are provided;

the message routing center is suitable for routing the messages transmitted from the outside and addressed to a mailbox of any one of the messaging service systems to said system, and is suitable for routing messages transmitted from a mailbox of any one of the messaging service systems and addressed to a mailbox of any other one of the messaging service systems to said other system;

between the third step and the fourth step, the messaging service systems communicate to the message routing center an address up synchronization request, containing the addresses associated with their mailboxes;

the second messaging service system communicates to the message routing center a list of the access addresses of the second mailbox; and the conditions required during the fourth step comprise verification by the message routing center that the up synchronization request received contains the access addresses of the list received from the second messaging service system for the first and second mailboxes;

the prescribed conditions for executing the third step comprise verifications performed on the user station of the first mailbox;

verifications performed on the user station of the first mailbox are performed for a second time a certain lapse of time after the first time that they are performed, and when said verifications are positive, said user station communicates to the migration control server information on the type and the memory size of the first mailbox;

prior to processing the migration requests, a choice is made between an operating mode with said verifications for executing the third step and an operating mode without said verifications for executing the third step;

the second messaging service system is connected to at least one data migration server and, after the fifth step executed for the first mailbox, a data transfer step is executed, during which the data migration server triggers transfer of the data present in the first mailbox of the first messaging service system to the second mailbox of the second messaging service system;

the migration control server records in its database an address migration identifier identifying address migration performed for the first mailbox for which the fifth step has been performed, the data transfer step being performed by the data migration server for the first mailboxes associated with an address migration identifier identifying address migration performed in the database of the migration control server;

when the fifth step has not been performed for the first mailbox and if said mailbox has diary data, the data migration server triggers transfer of the diary data of said first mailbox of the first messaging service system to the second mailbox of the second messaging service system;

after the data transfer step, the data migration server interrogates the migration control server to determine whether another mailbox exists for which the fifth step has been executed and, in the affirmative, the data migration server executes the data transfer step for the mailbox that is indicated to it by the migration control server and for which the fifth step has been executed;

prior to processing the migration requests, a choice is made between an operating mode with a data transfer step and an operating mode without a data transfer step;

the messaging service system is connected to at least one data migration server and, after the fifth step executed for the first mailbox, a local data transfer step is executed for transferring local data from the user station, during which step the user station of the first mailbox of the fist messaging service system triggers transfer of the data present in said user station to the second mailbox of the second messaging service system;

for the user station for which the local data transfer step has been executed, its parameterization is changed by default into a prescribed parameterization compatible with the second messaging service system;

prior to processing the migration requests, a choice is made between an operating mode with a local data transfer step during which local data is transferred from user stations, and an operating mode without a data transfer step from user stations;

for recording the migration request during the first step, the migration request is entered on an administration station connected to the migration control server, the entered migration request is sent from the administration station to the migration control server, and the migration request is recorded in a database of the migration control server;

the first electronic messaging service system includes at least one fourth electronic messaging service mailbox and is connected to at least one fourth user station of said fourth mailbox, and, during the fifth step, in the first electronic messaging service system, a redirection is established for redirecting the first mailbox towards the second mailbox, so as to redirect any message arriving at the first mailbox towards the second mailbox; and the first mailbox for which at least the fifth step has been executed is deleted from the first messaging service system;

The invention secondly provides apparatus for implementing the migration method according to any preceding claim, said apparatus being characterized in that it comprises:

a message routing center serving to be connected to the first and second messaging service systems and including a directory database containing the addresses associated with the mailboxes of the first and second messaging service systems;

a migration control server connected to the message routing center and suitable for recording at least one migration request containing, in association, at least the first access address of a first mailbox of the first messaging service system and a scheduled migration instant for migration of the first mailbox, the migration control server including means for controlling processing of each migration request recorded according to the second to fifth steps; and a data migration server serving to be connected to the messaging service systems, the migration control server being connected to the data migration server, and including control means for controlling said server, which means are suitable for causing it to execute a step for transferring data from the first mailbox to the second mailbox for the migration request processed in the fifth step.

BRIEF DESCRIPTION OF DRAWINGS

The invention will be better understood on reading the following description given merely by way of non-limiting example and with reference to the accompanying drawings, in which:

FIG. 2 is a flow chart of the migration method of the invention as implemented by the migration apparatus of FIG. 1.

DETAILED DESCRIPTION OF THE PRESENTLY PREFERRED EMBODIMENTS

Figure 1:
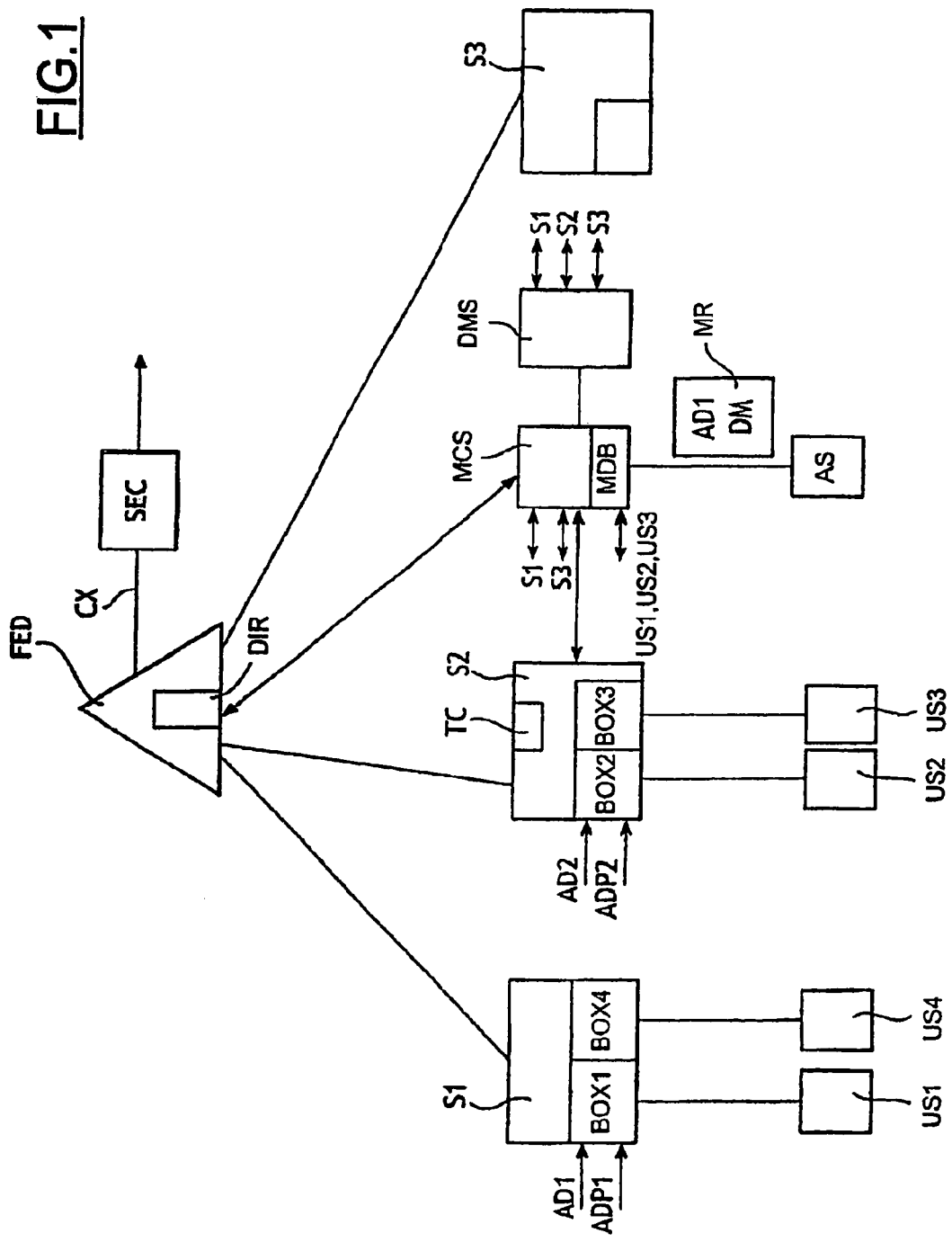
FIG. 1 is a diagram of migration apparatus of the invention.

FIG. 1 shows a plurality of electronic messaging service systems S1, S2, S3, each of which has its own electronic mail mailboxes. The term "mailbox" is used to mean an electronic mailbox or "emailbox" in the commonly understood sense, i.e. a memory zone in a computer or a server that makes it possible to store messages that are received or sent by electronic mail or "email". Electronic messaging service mailboxes are referred to below as mailboxes.

At least one user station such as US1, which can be a computer or personal digital assistant (PDA), is connected to the system S1. In the system S1, a mailbox BOX1 is assigned to the user station US1. Optionally, a plurality of user stations connected to the system S1 are assigned to the mailbox BOX1, e.g. one or more user stations US4 associated with one or more respective mailboxes BOX4 of the system S1.

In the system S1, the mailbox BOX1 has a physical electronic address ADP1 and at least one electronic access address AD1 giving access to users from the outside, i.e. from the other user stations interconnected via the system S1 and via the user stations of the other messaging service systems. For example, the access address AD1 may be an address of the SMTP type, such as forename.surname@domain.com or the like, an alias address being substituted therefor and serving for display in the address books and the messages of the mailbox, such as SURNAME FORENAME or the like, an address of the X400 type. The mailbox can have a plurality of addresses of the above-mentioned types as access address. For example, a plurality of complementary SMTP addresses are provided for the mailbox, so as keep old addresses and solve problems raised by double-barreled surnames and forenames.

The messaging service systems S1, S2, S3 are connected to a message routing center FED also referred to as a "federation of messaging services". The routing center FED has at least one connection CX for sending messages to the outside and receiving messages from the outside, e.g. to and from the Internet, and means SEC for offering security with respect to messages received from the outside, such as antivirus filtering relays. The routing center FED is suitable for routing messages transmitted to the outside and addressed to a mailbox of any one of the messaging service systems S1, S2, S3 to said system, and it is suitable for routing messages transmitted from a mailbox of any one of the messaging service systems S1, S2, S3 and addressed to a mail box of any other one of the messaging systems to said system. In addition, the routing center FED has a directory database DIR listing the addresses associated with the mailboxes of the systems S1, S2, S3. The database DIR is updated regularly, e.g. daily, by receiving from each messaging service system S1, S2, S3 an up synchronization request containing the addresses of each mailbox hosted on it. After each update, the routing center FED sends back, in a down synchronization request to each messaging service system S1, S2, S3, all of the addresses of the mailboxes of all of the messaging service systems S1, S2, S3 managed by the routing center FED. Each messaging service system S1, S2, S3 that has received a down synchronization request then updates its messaging service system address book, which is kept at the disposal of the user stations managed by the messaging service system.

Below, it is assumed that the system S1 is to migrate towards the system S2. Therefore, it is desired for all of the mailboxes of the system S1 to be caused to migrate towards the system S2. The migration method is explained below with reference to the mailbox BOX1 of the system S1, referred to as the "assignor system, the system S2 being referred to as the "assignee system".

A migration control server MCS and, when the data migration is to be performed, a data migration server DMS, are provided. Optionally, the migration control server MCS can be formed physically by plurality of servers, as can the data migration server DMS. In addition, the migration control server MCS and the data migration server DMS can be formed physically by the same server or by the same servers. The migration control serve MCS is suitable for being connected, e.g. via a network, to the messaging service systems S1, S2, S3, to the user stations US1, US2, US3 managed by the messaging service systems S1, S2, S3, and to the message routing center FED. The data migration server is suitable for being connected, e.g. via a network, to the messaging service systems S1, S2, S3. The server MCS and the server DMS can be located at any place in the apparatus, e.g. in the vicinity of the assignee system S2.

During a step E1, a migration request MR is recorded in the server MCS, which request contains at least in association the access address AD1 of the first mailbox BOX1, referred to as the first access address, and a scheduled instant DM for migration of the first mailbox BOX1. For example, for this purpose, an administration station AS is provided which is connected to the migration control server MCS, and on which a person enters the migration request MR. The station AS sends the migration request MR entered to the server MCS, which records the request MR in a database MDB of said server, in association with a request state 0, the states being indicated in circled manner in FIG. 2.

After step E1, for each request MR recorded in the server MCS, the server MCS causes a new electronic messaging service mailbox BOX2 referred to as the "second" mailbox BOX2 to be created, during a step E2, in the second system S2, to which second mailbox the first mailbox BOX1 is to migrate. The server MCS executes, for example, the second step E2 for each request MR that is recorded in it in association with a determined request state 0. The second mailbox BOX2 can be created several days before the date on which the migration actually takes place.

The second mailbox BOX2 created by the server MCS in the second system S2 has a second physical electronic address ADP2 in said second system that is therefore different from the first physical electronic address ADP1 of the first mailbox BOX1 in the first system S1. Once step E2 has been executed, the new state 1 is associated with the request MR for the first access address AD1 initially associated with the request state 0.

The second system S2 initially has no mailbox or associated user station connected to it or, as shown, the second system S2 initially has one or more native mailboxes BOX3, i.e. mailboxes already hosted from the outset for user stations US3 of said mailboxes that are connected to the system S2.

In the example shown in the figures, the second mailbox BOX2 is created in the system S2 with a second access address AD2, which address makes it possible to access the mailbox BOX2 only from the user stations US3 managed by the system S2. In this example, during step E2, the second mailbox BOX2 created is redirected towards the first mailbox BOX1 so as to redirect any message arriving at the second mailbox BOX2 towards the first mailbox BOX1. It is thus possible to prevent messages sent from the stations US3 to the second mailbox BOX2 by users aware of the existence of said mailbox in the system S2 from being lost and from being received by the second mailbox BOX2 only once the date of migration performed has arrived. Such redirection thus makes it possible to guarantee continuity of service for the messaging service for users managed by the second messaging service system.

After step E2, the server MCS examines whether prescribed conditions, including the arrival of the instant of migration DM scheduled in step E3, are satisfied for migration requests MR for which the step E1 has been executed, in the preceding example the requests MR having a determined state 1. If the prescribed conditions are satisfied, the server MCS causes a step E4 to be executed in the second system S2, during which step the first access address AD1 of the first mailbox BOX1 is formed for the second mailbox BOX2 as the access electronic address for access to users from the outside. In the preceding example, execution of step E4 causes the determined state 4 for the request MR in the server MCS.

Examples of additional actions executed during the step E4 are described below. During the step E4, a "true" marker SYNCFED for the mailbox BOX2 is caused to be inserted into the user accounts base of the messaging service system S2. In the above-mentioned example, said redirection is cancelled during step E4. In addition, during the step E4, the database MDB with directory data DIR communicates the contact who is recorded therein and who is formed by the addresses and aliases associated with the first access address AD1 to the second system S2, which system records it in a table TC of contacts provided therein. The addresses and/or aliases that are associated in said table of contacts with the contact having the first access address AD1 are formed as additional access electronic addresses for users from the outside for the second mailbox BOX2, and then said contact is deleted from the table TC.

After the step E4, in the example shown, the server MCS extracts from its database MDB, during the step E5, the list of the mailboxes that are to migrate. In the above-mentioned example, said list is extracted from mailboxes associated with a marker SYNCFED positioned to "true" in the second system S2.

Then, after the step E5 or E4, the steps E6 and E7 are performed. During the step E6, the messaging service systems S1, S2, S3 communicate to the center FED an address up synchronization request containing the addresses associated with their mailboxes that they host. During the step E7, the second system S2 communicates to the center FED a list of access addresses for each mailbox for which the step E4 has been executed, i.e. in the preceding example for the mailboxes associated with a state 4 in the server MCS, i.e. the second mailbox BOX2, or the list of mailboxes that are to migrate from step E5.

After the steps E6 and E7, the center FED examines, during the step E8, whether conditions required for the first and second mailboxes BOX1 and BOX2 are satisfied. For example, the center FED verifies whether the up synchronization request received in step E6 from the second system S2 contains the access addresses of the list received from the system S2 in the step E7 for the first and second mailboxes BOX1 and BOX2. In the negative, the migration will not be performed from the mailbox BOX1 to the mailbox BOX2, and the center FED will so inform the server MCS by writing an error message, and the state will no longer change for this mailbox. In the affirmative, the center FED activates for the first mailbox BOX1 a queue retaining any messages that arrive for it from the outside, which messages are addressed to the first access address AD1, so that said messages do not arrive at the first mailbox BOX1, means being provided in the message routing center FED for implementing said queue. The messages arriving at the message routing center FED that are addressed to the access address AD1 are then retained and stored in the activated queue, and are not sent by the message routing center FED to the first messaging service system S1 hosting the first mailbox BOX1 associated with the access address AD1 for which the queue is activated. Since the queue is activated, the state goes to 5 in the server MCS for the first mailbox BOX1. In the affirmative at step E8, the method goes to step E9 for the corresponding mailboxes.

At step E9, the center FED updates in its directory database DIR, on the basis of the up synchronization request received, the addresses recorded for the mailboxes BOX1 and BOX2 of the systems S1, S2, i.e. in the preceding example for the mailboxes having the state 5. The routing center FED changes in its directory database DIR the physical address ADP1 of the first mailbox BOX1 into the physical address ADP2 of the second mailbox BOX2. Thus, all future messages addressed to the mailbox BOX1 will be sent to the mailbox BOX2. Then the queue for the first mailbox BOX1 is deactivated in the message routing center FED and any messages retained in said queue and addressed to the access address AD1 are routed by the routing center FED directly from it to the second mailbox BOX2 that is in the second system S2 at the access address AD1 and the physical address ADP2 of the second mailbox BOX2, without going via the system S1. The routing center FED communicates to the migration control server MCS information indicating that address migration has been performed. In the preceding example, the state goes to 6 in the server MCS for the first mailbox BOX1. The address migration has then been performed from the first mailbox BOX1 to the second mailbox BOX2. When an address migration from one mailbox has been performed, it is possible to go to address migration from another mailbox indicated in the migration request or to processing of another migration request according to the steps described above.

In the example shown in the figures, during the step E9, redirection in the first system S1 from the first mailbox BOX1 to the second mailbox BOX2 is also performed so as redirect to the second mailbox BOX2 of the second system S2 any message sent to the system S1 by the station US4 managed by the system S1 at the access address AD1 of the first mailbox BOX1. It is thus prevented that the messages sent from stations US'1 to the first mailbox BOX1 by users of the system S1 from being lost and from not being received by the second mailbox BOX2. This redirection thus makes it possible to guarantee continuity of service for the messaging service for users managed by the first messaging service system. For example, this redirection is performed by the fact that the first system S1 outputs towards the center FED all of the messages sent from the stations US1 to the mailbox BOX1, the center FED then routing said messages received in the system S1 to the second mailbox BOX2 of the system S2. This redirection is cancelled when the first mailbox BOX1 is cancelled, as described in step E41.

Prior to processing the migration requests, a choice is made between an operating mode with data transfer and an operating mode without data transfer.

In general, each operating mode with or without data transfer and the other operating modes are automatic, are recorded in the server MCS, and each constitute a scenario including a description of the actions to be executed. The choice of operating mode is made in the migration request MR entered in the station PA and recorded in the server MCS.

When the operating mode with data transfer has been selected, the next steps are executed for the mailboxes for which the step E9 has been executed. The step E9 executed is, for example, accompanied with recording in the database MDB of the server MCS of an identifier of address migration performed for the first mailbox BOX1. The operating mode with data transfer is performed for the mailboxes associated with the identifier of the address migration performed in the server MCS, as explained below. Below it is assumed that the data is to be transferred from the first mailbox BOX1 to the second mailbox BOX2.

During the step E11, the server MCS asks whether the operating mode with data transfer has been selected with integration of data of the first system S1 or without integration of data of the first system S1. In the affirmative at step E11, data of the first system S1, concerning the first mailbox BOX1, is validated during the step E12.

The method goes to step E13 in which data migration starts. In the negative at step E11, the method goes directly to step E13.

During the step E13, the server DMS asks the server MCS to supply to it the addresses of a mailbox whose data is to migrate. The server MCS then supplies, e.g. to the server DMS the addresses AD1 and ADP1 of the first mailbox BOX1 in the system S1, and causes its associated state to go to 7.

Then, during the step E14, the server DMS interrogates the server MCS to determine whether the addresses that the server MCS has supplied to it are those of a mailbox that has migrated towards the system S2, i.e. for which step E9 has been executed, and, in the preceding example, which is associated in the database MDB of the server MCS with an address migration identifier. In the affirmative, which is the case for the first mailbox BOX1, the server DMS goes to step E15. In the negative, the server DMS goes to step E16, during which the server DMS interrogates the server MCS to determine whether the addresses that the server MCS have supplied to it correspond to a mailbox of a messaging service system optionally having diary or calendar data. In the affirmative at step E16, the diary data is integrated during the step E17 with the data that is to migrate from the first mailbox BOX1 of the system S1 to the second mailbox of the system S2 and the associated state in the server MCS goes to 8. In the negative at step E16, and after the step E17, the method goes to the step E18. Optionally, in an operating mode chosen in advance in the server MCS, the steps E16 and E17 are not implemented, and in the negative at step E14, the method goes directly to step E18.

At step E15, the server DMS triggers transfer of data present in the first mailbox BOX1 of the first system S1 to the second mailbox BOX2 of the second system S2 and causes the associated state to go to 8. For example, the data includes old messages received or transmitted by the first mailbox BOX1 and stored in the mailbox BOX1.

At step E18, the server DMS interrogates the server MCS to determine whether another mailbox exists for which the fifth step has been executed, and, in the affirmative, the data migration server DMS returns to the step E13 for said other mailbox, and executes the data transfer step E14, E15, E16, E17 as above for the mailbox that is indicated to it by the migration control server MCS and for which the step E9 has been executed. When there are no more mailboxes for which the step E9 has been executed, the server MCS so indicates to the server DMS at step E18, and the method goes to the end step E19.

In the example shown, the prescribed conditions for executing the step E4 further include verifications performed on the user station US1 of the first mailbox BOX1 during the step E20 and triggered by the user station on authorization from the server MCS.

Prior to processing the migration requests, a choice is made between an operating mode with said verifications for executing step E4 and an operating mode without said verifications for executing step E4. When said verifications executed on the station US1 are positive, the state associated with the first mailbox BOX1 in the server MCS goes from the initial state 1 to the state 2.

Then said verifications on the user station of the first mailbox BOX1 are performed a second time during step E22 a predetermined time lapse after the first time that they are executed, slightly before the scheduled migration instant, at an instant planned during the preceding step E21. When the verifications are positive, said user station US1 communicates to the migration control server MCS information on the type and the memory size of the first mailbox BOX1, causes the state of the first mailbox in the server MCS to go to 3, during step E23. The step E23 is then followed by the step E4, when step E3 is executed. When the verifications are negative, the method is ended for this mailbox BOX1 at step E24, and neither address migration nor data migration is executed for said mailbox.

In addition, prior to processing the migration requests, a choice is made between an operating mode with a step of transferring local data from user stations and an operating mode without transfer of data from user stations. The choice of the operating mode with a local data transfer step is made, for example, when the operating mode with said verifications on the user station US1 of the first mailbox BOX1 according to steps E20 to E23 is chosen previously.

When the mode of operation with a local data transfer step is chosen, the step E9, when it has been executed, is also followed by the step E30, during which the user station US1 of the first mailbox BOX1 of the first messaging service system S1 asks the migration control server MCS whether the preliminary steps have been performed. If the migration control server MCS answers "yes", the user station US1 triggers transfer of the data present in the user station US1 to the second mailbox BOX2 of the second messaging service system S2. It is also possible, instead of that, merely to convert the format of the messaging service data of the user station US1 to the format usable by the messaging service software implemented for using the second mailbox BOX2 of the second messaging service system S2. Then the parameterization or profile of the station US1 is changed by default into a prescribed parameterization compatible with the second messaging service system S2. During the next step E31, a test for proper operation of the parameterization of the station US1 is triggered on the station US1 by the server MCS during the step E31. If this test is negative, the method goes to step E32, during which error analysis and/or rectification and/or rerunning the local data migration process is performed automatically on the station US1 and the method returns to the step E30. If this test is positive, the server MCS triggers deletion of the old parameterization on the station US1 at the step E33. The step E33 is followed by an end-of-processing step, at which the state associated with the first mailbox BOX1 goes to 9.

When, for the first mailbox BOX1, the steps E34 and E15 or E17 are complete, i.e. when its associated state is at 8 or 9, the migration of the data and of the addresses is terminated for said mailbox, and a corresponding state 10 is positioned in the server MCS for said mailbox at step E40.

Then, optionally, the first mailbox BOX1, or more generally the "old" mailboxes of the first system S1, whose addresses and data, or only the addresses in the case of the operating mode without data migration, have migrated into the second system S2, is/are deleted in the system S1 during the step E41 following step E40. The state of the mailbox BOX1 in the server S2 then goes to 13 at the step E42. Then, periodically, the recordings concerning the old mailboxes associated with state 13 in the database MDB of the server MCS are deleted during step E43.

By way of indication, FIG. 2 includes, for each step, the instant of execution of said step, in the form Day (D−3, D−1, D+7), Hour, Minutes.

The invention claimed is:

1. A method for causing a first electronic messaging service mailbox of a first electronic messaging service system connected to a first user station for a user of said first electronic messaging service mailbox to migrate towards a second electronic messaging service system, the first electronic messaging service mailbox having a first physical electronic address and a first access electronic address for providing access to outside users, the method comprising:
   connecting each of the first and second electronic messaging service systems to a message routing center including a directory database containing addresses associated with mailboxes of first and second electronic messaging service systems; and
   recording, during a first step, a migration request on a migration control server, which request contains, in association, at least the first access electronic address of the first electronic messaging service mailbox and a scheduled migration instant for migration of the first electronic messaging service mailbox;
   for each migration request recorded in the migration control server, and in succession,
      creating, during a second step, a second electronic messaging service mailbox having a second physical electronic address in the second electronic messaging service system; and
      executing a third step in the second electronic messaging service system when prescribed conditions including arrival of the scheduled migration instant have been verified as satisfactory, during which the first access electronic address of the first electronic messaging service mailbox is formed as the electronic access address for outside users of the second electronic messaging service mailbox;
   when conditions required on the first and second electronic messaging service mailboxes have been verified by the message routing center as satisfactory,
      activating a queue, during a fourth step, in the message routing center, and for the first electronic messaging service mailbox, for any incoming messages that are addressed to the first access electronic address so that the any incoming messages do not arrive in the first electronic messaging service mailbox; and
      changing in the directory database, during a fifth step, the first physical electronic address recorded for the first electronic messaging service mailbox into the second physical electronic address of the second electronic messaging service mailbox, deactivating the queue, and transferring messages held in the queue for the first electronic messaging service mailbox to the second electronic messaging service mailbox.

2. The migration method according to claim 1, wherein the second electronic messaging service system has a third electronic messaging service mailbox and is connected to a third user station of said third electronic messaging service mailbox, and the second electronic messaging service mailbox created during the second step further includes the first access electronic address as its access address for access from the third user station of the second electronic messaging service system, and, during the second step, establishing redirection in the second electronic messaging service system for redirecting the second electronic messaging service mailbox towards the first electronic messaging service mailbox so as to redirect any message arriving at the second electronic messaging service mailbox towards the first electronic messaging service mailbox, said redirection being cancelled during the third step.

3. The migration method according to claim 1, wherein
   the directory database records the addresses associated with the first and second electronic messaging service mailboxes of the electronic messaging service systems including their aliases;
   during the third step, the directory database communicates a contact formed by the addresses and aliases associated with the first access electronic address to the second electronic messaging service system, which records the contact in a table of contacts provided in said second electronic messaging service system, at least one of the addresses and aliases associated in said table of contacts with the contact having the first access electronic address being formed as an additional access electronic address for the outside users of the second electronic messaging service mailbox said contact being subsequently deleted from the table.

4. The migration method according to claim 1, wherein a plurality of first electronic messaging service systems are connected to at least one electronic messaging service mailbox user station.

5. The migration method according to claim 1, wherein the message routing center is configured to route messages transmitted from the outside and addressed to an electronic messaging service mailbox of one of the first and second electronic messaging service systems to said one of the first and second electronic messaging service systems, and is configured to route messages transmitted from an electronic messaging service mailbox of one of the first and second electronic messaging service systems and addressed to the electronic messaging service mailbox of the other of the first and second electronic messaging service systems said other of the first and second electronic messaging service systems.

6. The migration method according to claim 1, wherein
   between the third step and the fourth step, the first and second electronic messaging service systems communicate to the message routing center an address up synchronization request, containing the addresses associated with their electronic messaging service mailboxes;
   the second messaging service system communicates to the message routing center a list of access addresses of the second electronic messaging service mailbox; and
   wherein the conditions required during the fourth step comprise verification by the message routing center that a received address up synchronization request contains the access addresses of the list received from the second electronic messaging service system for the first and second electronic messaging service mailboxes.

7. The migration method according to claim 1, wherein the prescribed conditions for executing the third step comprise verifications performed on the user station of the first electronic messaging service mailbox.

8. The migration method according to claim 7, wherein the verifications performed on the user station of the first electronic messaging service mailbox are performed for a second time, after a predetermined lapse of time after the verifications are first performed, and when said verifications are positive, said user station communicates to the migration control server information on a type and memory size of the first electronic messaging service mailbox.

9. The migration method according to claim 7, wherein prior to processing migration requests, a choice is made between an operating mode with said verifications for executing the third step and an operating mode without said verifications for executing the third step.

10. The migration method according to claim 1, wherein the second electronic messaging service system is connected to a data migration server and, after the fifth step is executed for the first mailbox, a data transfer step is executed, during which the data migration server triggers transfer of data present in the first electronic messaging service mailbox of the first electronic messaging service system to the second electronic messaging service mailbox of the second electronic messaging service system.

11. The migration method according to claim 10, wherein the migration control server records in its database an address migration identifier which identifies address migration performed for the first electronic messaging service mailbox for which the fifth step has been performed, the data transfer step being performed by the data migration server for the first electronic messaging service mailboxes associated with the address migration identifier which identifies the address migration performed in the database of the migration control server.

12. The migration method according to claim 10, wherein, when the fifth step has not been performed for the first electronic messaging service mailbox and if said first electronic messaging service mailbox has diary data, the data migration server triggers transfer of the diary data of said first electronic messaging service mailbox of the first electronic messaging service system to the second electronic messaging service mailbox of the second electronic messaging service system.

13. The migration method according to claim 10, wherein, after the data transfer step, the data migration server interrogates the migration control server to determine whether another electronic messaging service mailbox exists for which the fifth step has been executed and, in the affirmative, the data migration server executes the data transfer step for the electronic messaging service mailbox that is determined by the migration control server and for which the fifth step has been executed.

14. The migration method according to claim 10, wherein, prior to processing migration requests, a choice is made between an operating mode with the data transfer step and an operating mode without the data transfer step.

15. The migration method according to claim 1, wherein the second messaging service system is connected to at least one data migration server and, after the fifth step is executed for the first electronic messaging service mailbox, a local data transfer step is executed for transferring local data from the first user station, during which local data transfer step the first user station of the first electronic messaging service mailbox of the first electronic messaging service system triggers transfer of data present in said first user station to the second electronic messaging service mailbox of the second electronic messaging service system.

16. The migration method according to claim 15, wherein, for the first user station for which the local data transfer step has been executed, parameterization of the first user station is changed by default into a prescribed parameterization compatible with the second electronic messaging service system.

17. The migration method according to claim 15, wherein, prior to processing migration requests, a choice is made between an operating mode with a local data transfer step during which local data is transferred from user stations and an operating mode without the data transfer step from user stations.

18. The migration method according to claim 1, wherein, for recording the migration request during the first step, the migration request is entered on an administration station connected to the migration control server, the entered migration request is sent from the administration station to the migration control server, and the migration request is recorded in a database of the migration control server.

19. The migration method according to claim 1, wherein the first electronic messaging service system includes a fourth electronic messaging service mailbox and is connected to a fourth user station of said fourth electronic messaging service mailbox, and, during the fifth step, in the first electronic messaging service system, a redirection is established for redirecting the first electronic messaging service mailbox towards the second electronic messaging service mailbox, so as to redirect any message arriving at the first electronic messaging service mailbox towards the second electronic messaging service mailbox.

20. The migration method according to claim 1, wherein the first electronic messaging service mailbox, for which at least the fifth step has been executed, is deleted from the first electronic messaging service system.

21. Apparatus for implementing a migration method, said apparatus comprising:
a message routing center which is connectable to the first and second electronic messaging service systems and includes a directory database containing addresses associated with respective first and second electronic messaging service mailboxes of the first and second electronic messaging service systems, the first electronic messaging service mailbox having a first physical electronic address and a first access electronic address for providing access to outside users:
a migration control server connected to the message routing center, the migration control server being configured to record a migration request containing, in association, a first access address of the first electronic messaging service mailbox of the first electronic messaging service system and a scheduled migration instant for migration of the first electronic messaging service mailbox, the migration control server including means for controlling processing of each recorded migration request; and
a data migration server which is connectable to the first and second electronic messaging service systems, the migration control server being connected to the data migration server, and including control means for controlling said migration control server, which means are configured to cause said migration control server to execute a first step for transferring data from the first electronic messaging service mailbox to the second electronic messaging service mailbox for the migration request processed in a fifth step;
wherein for each migration request recorded in the migration control server, and in succession, during a second step, a second electronic messaging service mailbox having a second physical electronic address is created in the second electronic messaging service system; and when prescribed conditions including arrival of the scheduled migration instant have been verified as satisfactory, a third step is executed in the second electronic messaging service system, during which the first access electronic address of the first electronic messaging service mailbox is formed as the electronic access address for outside users of the second electronic messaging service mailbox: and wherein when conditions required on the first and second electronic messaging service mailboxes have been verified by the message routing center as satisfactory, during a fourth step, in the message routing center, and for the first electronic messaging service mailbox, a queue is activated for any incoming messages that are addressed to the first access electronic address so that the incoming messages do not arrive in the first electronic messaging service mailbox; and during the fifth step, within the directory database, the first physical electronic address recorded for the first electronic messaging service mailbox is changed into the second physical electronic address of the second electronic messaging service mailbox, the queue is deactivated, and the any incoming messages held in the queue for the first electronic messaging service mailbox are transferred to the second electronic messaging service mailbox.

* * * * *